United States Patent
Tsuchie

(10) Patent No.: US 10,439,476 B2
(45) Date of Patent: Oct. 8, 2019

(54) COOLING STRUCTURE FOR ROTATING ELECTRIC MACHINE

(71) Applicant: HONDA MOTOR CO., LTD., Tokyo (JP)

(72) Inventor: Tetsuhiro Tsuchie, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1008 days.

(21) Appl. No.: 14/071,654

(22) Filed: Nov. 5, 2013

(65) Prior Publication Data

US 2014/0125162 A1    May 8, 2014

(30) Foreign Application Priority Data

Nov. 8, 2012  (JP) .................................. 2012-245884

(51) Int. Cl.
| | |
|---|---|
| *H02K 9/19* | (2006.01) |
| *H02K 3/24* | (2006.01) |
| *H02K 5/20* | (2006.01) |
| *H02K 9/193* | (2006.01) |

(52) U.S. Cl.
CPC ............ *H02K 9/193* (2013.01); *H02K 9/19* (2013.01); *H02K 3/24* (2013.01); *H02K 5/20* (2013.01)

(58) Field of Classification Search
CPC ............ H02K 5/225; H02K 5/20; H02K 5/22; H02K 9/06; H02K 3/24; H02K 9/19; H02K 9/193; H02K 9/20
USPC ............... 310/52, 54, 58, 59, 61, 63, 57
See application file for complete search history.

(56) References Cited

U.S. PATENT DOCUMENTS

| | | | | |
|---|---|---|---|---|
| 2009/0127969 A1* | 5/2009 | Okuyama | ............. | H02K 3/522 310/215 |
| 2010/0045125 A1* | 2/2010 | Takenaka | ................ | H02K 1/20 310/54 |
| 2013/0169073 A1* | 7/2013 | Nagahama | ............... | H02K 9/19 310/43 |

FOREIGN PATENT DOCUMENTS

| | | | | |
|---|---|---|---|---|
| EP | 2159906 A2 | * | 3/2010 | ............. H02K 9/19 |
| JP | 2006014522 A | * | 1/2006 | |
| JP | WO 2012046307 A1 | * | 4/2012 | ............. H02K 9/19 |
| WO | WO 2012/046307 | | 4/2012 | |

OTHER PUBLICATIONS

Kawamura (JP 2006014522 A) English Translation.*

* cited by examiner

*Primary Examiner* — Quyen P Leung
*Assistant Examiner* — Robert E Mates
(74) *Attorney, Agent, or Firm* — Mori & Ward, LLP

(57) ABSTRACT

A cooling structure for a rotating electric machine includes a stator, a plurality of refrigerant supply ports, and a refrigerant supply passage. The stator includes a stator core, an insulating member, and a plurality of coils. Each of the plurality of coils includes a corner portion having an arc shape when viewed in a radial direction. The plurality of refrigerant supply ports are arranged at a distance from the plurality of coils in a rotational axis direction. Each of the plurality of refrigerant supply ports is arranged at a position opposite to the corner portion located at a vertically upper side, on both sides of an imaginary vertical plane.

3 Claims, 7 Drawing Sheets

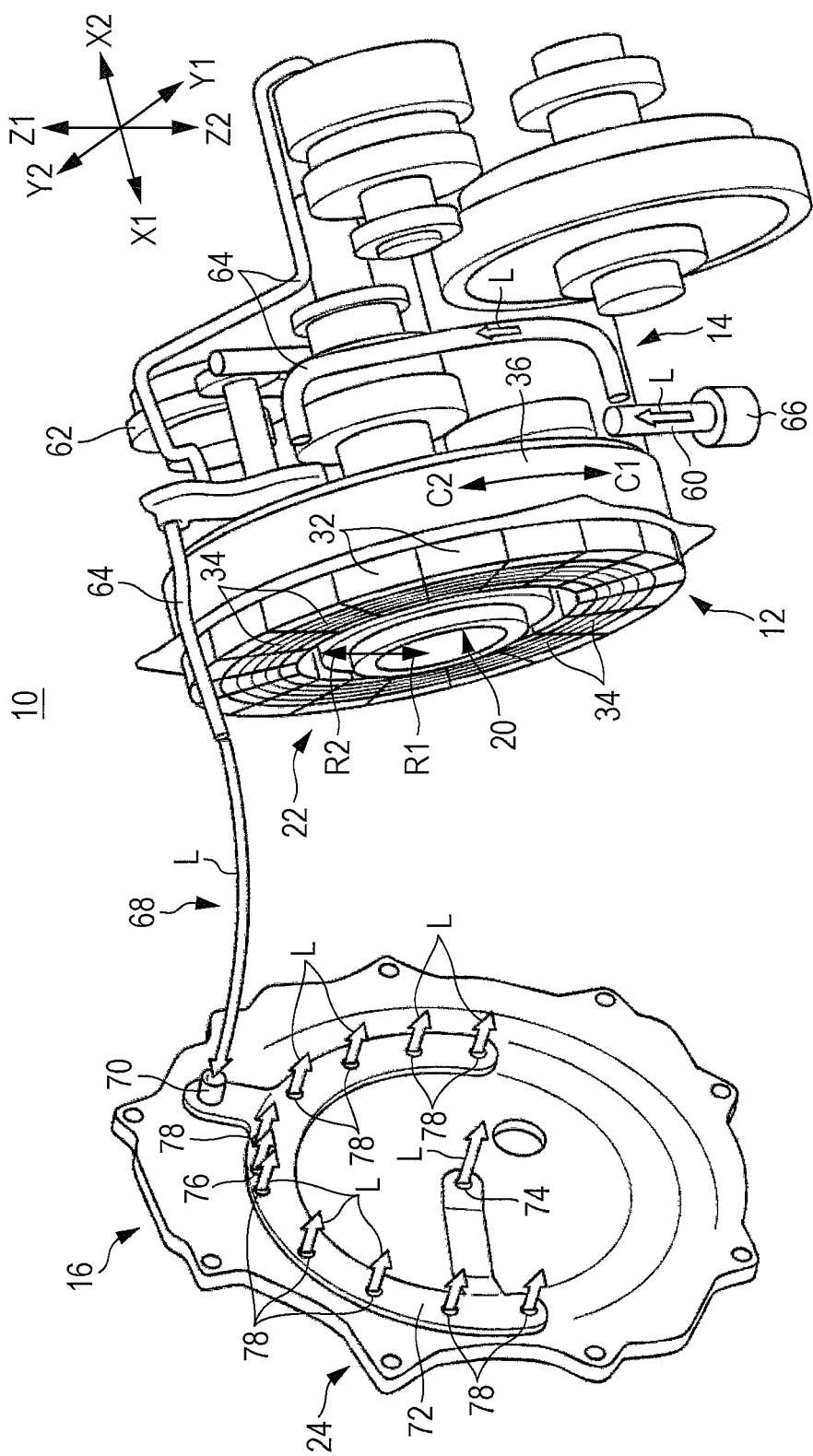

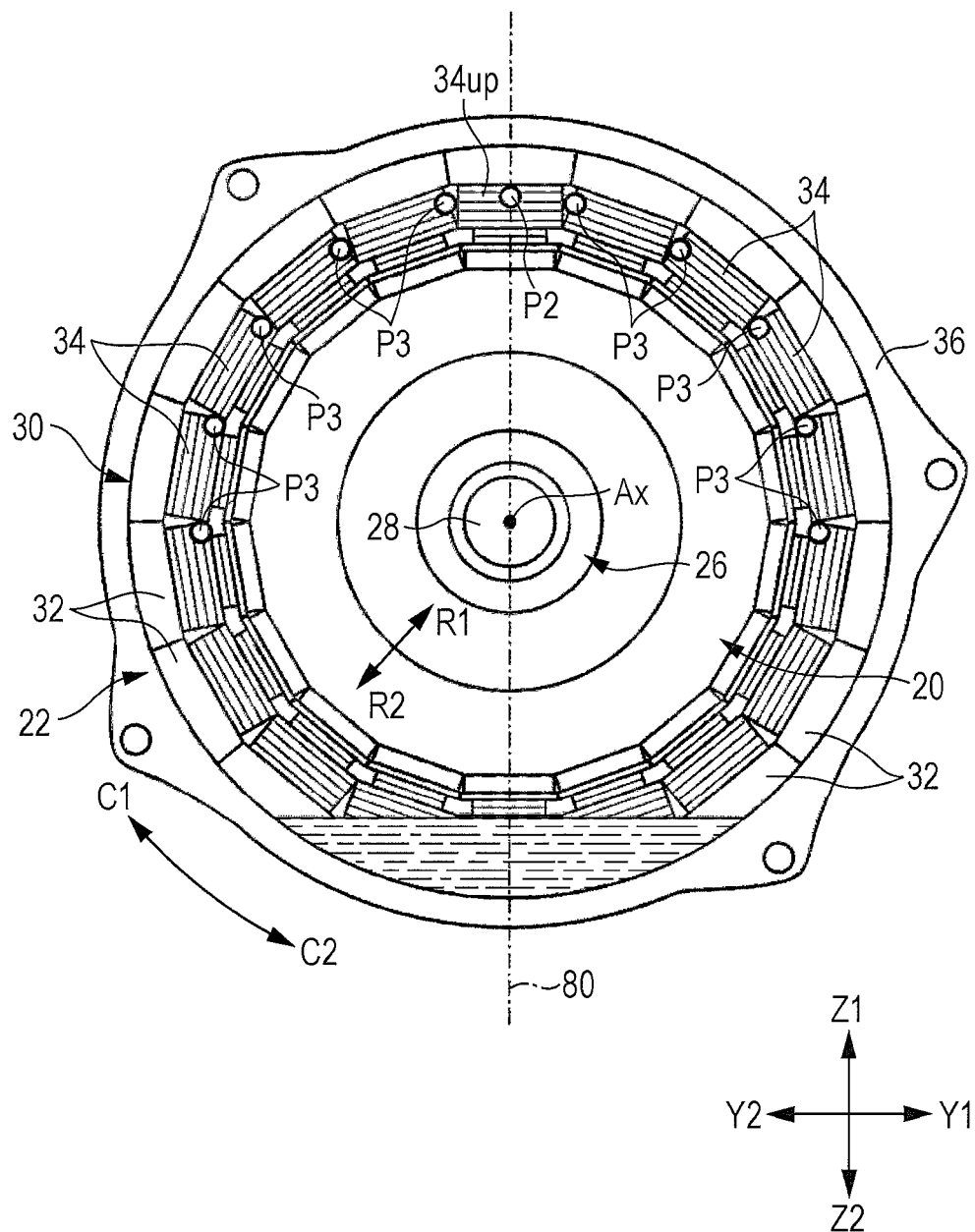

COOLING STRUCTURE FOR ROTATING ELECTRIC MACHINE

CROSS-REFERENCE TO RELATED APPLICATIONS

The present application claims priority under 35 U.S.C. § 119 to Japanese Patent Application No. 2012-245884, filed Nov. 8, 2012, entitled "Cooling Structure for Rotating Electric Machine." The contents of this application are incorporated herein by reference in their entirety.

BACKGROUND

1. Field

The present disclosure relates to a cooling structure for a rotating electric machine.

2. Description of the Related Art

In International Publication WO 2012/046307, it is disclosed that a side cover 82 that covers the side portion of an electric motor 7 is formed of resin, and cooling is accomplished by spraying lubricating oil to a stator 71 of the electric motor 7 from a plurality of discharge holes 95 of an oil passage 90 provided in the side cover 82 (Abstract). The discharge holes 95 are provided at a distance from each other in the circumferential direction, at positions corresponding to the respective upper semicircle portions of a plurality of salient-pole concentrated winding coils 71c of the stator 71 ([0069], FIGS. 2 to 5). The discharge holes 95 are arranged so that lubricating oil is injected toward a radially central portion 71c1 of a curved, bent portion of each salient-pole concentrated winding coil 71c which is wound around the body of an insulator that has a substantially rectangular shape ([0069]).

SUMMARY

According to one aspect of the present invention, a cooling structure for a rotating electric machine includes a stator, a plurality of refrigerant supply ports, and a refrigerant supply passage. The stator includes a stator core, an insulating member, and a plurality of coils. The stator core includes a yoke part and teeth. The yoke part has an annular shape. The teeth extends from the yoke part in a radial direction of the rotating electric machine. The teeth has a conductor winding part that is based on a prism shape. The plurality of coils are provided by winding a conductor around the conductor winding part via the insulating member. The plurality of coils are arranged in an annular shape when viewed in a rotational axis direction of the rotating electric machine. Each of the plurality of coils includes a corner portion having an arc shape when viewed in the radial direction. The plurality of refrigerant supply ports are arranged at a distance from the plurality of coils in the rotational axis direction. The refrigerant supply passage is to guide a refrigerant to the plurality of refrigerant supply ports. The plurality of refrigerant supply ports are arranged at a distance from each other at least in a circumferential direction of the rotating electric machine. The plurality of refrigerant supply ports are arranged substantially symmetrically on both sides of an imaginary vertical plane. The imaginary vertical plane is defined along a vertical direction of the rotating electric machine and including a rotational axis of the rotating electric machine. Each of the plurality of refrigerant supply ports is arranged at a position opposite to the corner portion located at a vertically upper side, on the both sides of the imaginary vertical plane.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 1 is an explanatory diagram illustrating a part of a vehicle equipped with a cooling system that is a cooling structure according to an embodiment of the present disclosure;

FIG. 2 is a schematic illustration of a motor as viewed in the rotational axis direction;

DESCRIPTION OF THE EMBODIMENTS

Figure 3A:
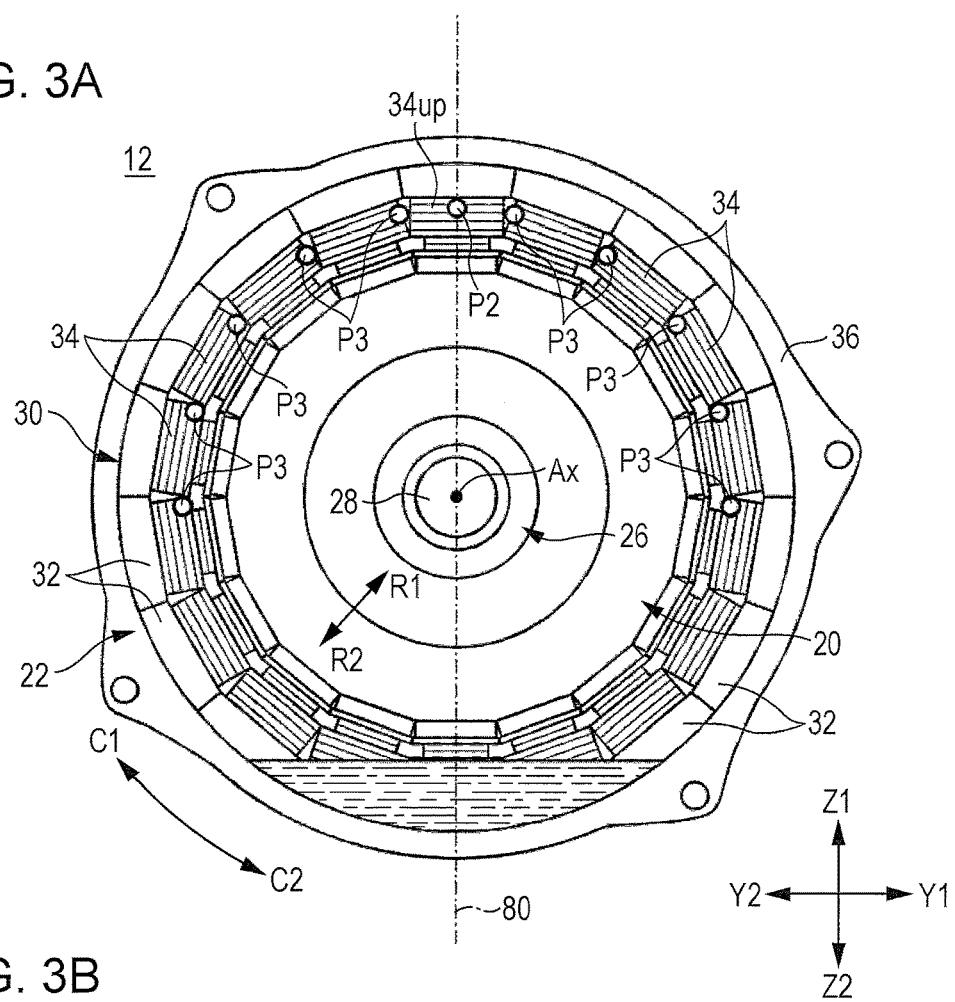
FIG. 3A is a schematic illustration of the motor as viewed in the rotational axis direction (the same as FIG. 2)

The embodiments will now be described with reference to the accompanying drawings, wherein like reference numerals designate corresponding or identical elements throughout the various drawings.

A. Embodiment

1. Description of General Configuration

[1-1. General Configuration]

FIG. 1 is an explanatory diagram illustrating a part of a vehicle 10 equipped with a cooling system 16 that is a cooling structure according to an embodiment of the present disclosure. In FIG. 1, arrows X1, X2, Y1, Y2, Z1, and Z2 indicate directions defined with reference to a motor 12. Specifically, the arrows X1 and X2 indicate the longitudinal direction of the motor 12 (the direction of the rotational axis of the motor 12), the arrows Y1 and Y2 indicate the transverse direction of the motor 12, and the arrows Z1 and Z2 indicate the vertical direction of the motor 12. A hollow arrow L in FIG. 1 indicates a flow of refrigerant (for example, cooling oil).

As shown in FIG. 1, in addition to the cooling system 16, the vehicle 10 has the motor 12 that serves as a rotating electric machine, and a speed reducer 14 that serves as a gear mechanism. As will be described later, a part of the motor 12 also constitutes a part of the cooling system 16. A part of the speed reducer 14 is arranged so as to fit into the motor 12. As for the basic configuration of the vehicle 10, a configuration according to related art may be used. The configuration is described in, for example, International Publication WO 2012/046307, the entire contents of which are incorporated herein by reference.

[1-2. Motor 12]

(1-2-1. General Configuration of Motor 12)

Figure 3B:
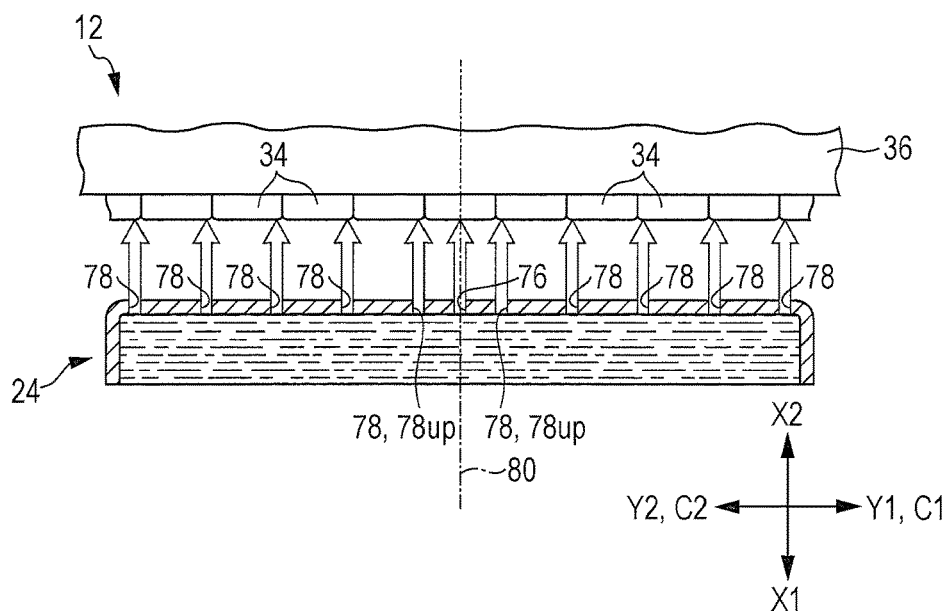
FIG. 3B is an illustration, as viewed in the vertical direction, of how refrigerant is discharged to the motor from a side cover.

FIG. 2 is a front view schematically illustrating a configuration of the motor 12. FIG. 2 also illustrates the positions P3 of third discharge holes 78 of a side cover 24 which will be described later. FIG. 3A is a schematic illustration of the motor 12 as viewed in the rotational axis direction X2 (the same as FIG. 2). FIG. 3B is an illustration, as viewed in the vertical direction Z2, of how refrigerant is discharged to the motor 12 (a stator 22 described later) from the side cover 24. As can be appreciated from the illustration of the third discharge holes 78 in FIG. 3A, FIG. 3B illustrates the cross-section of the side cover 24 taken along a circumferential direction C1-C2.

Figure 4:
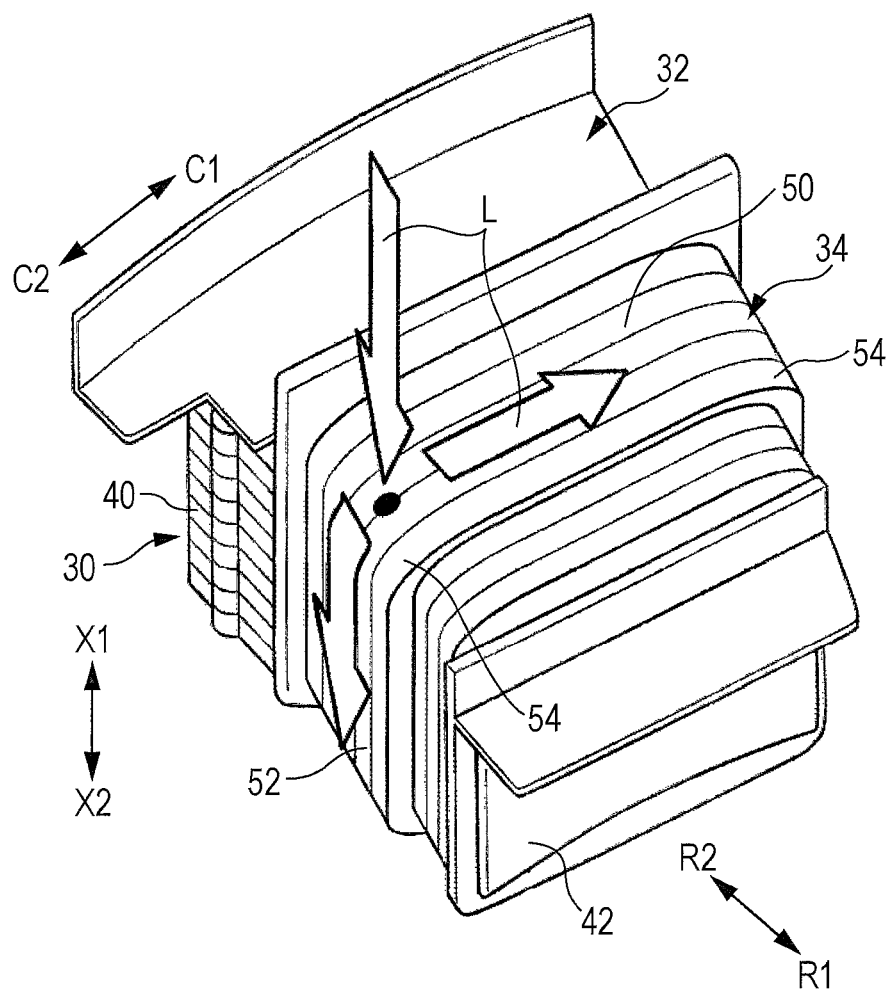
FIG. 4 is a perspective view illustrating the outward appearance of a part of the motor on the right side of an imaginary vertical plane lying along the vertical direction and including a rotational axis in FIG. 2.
Figure 5A:
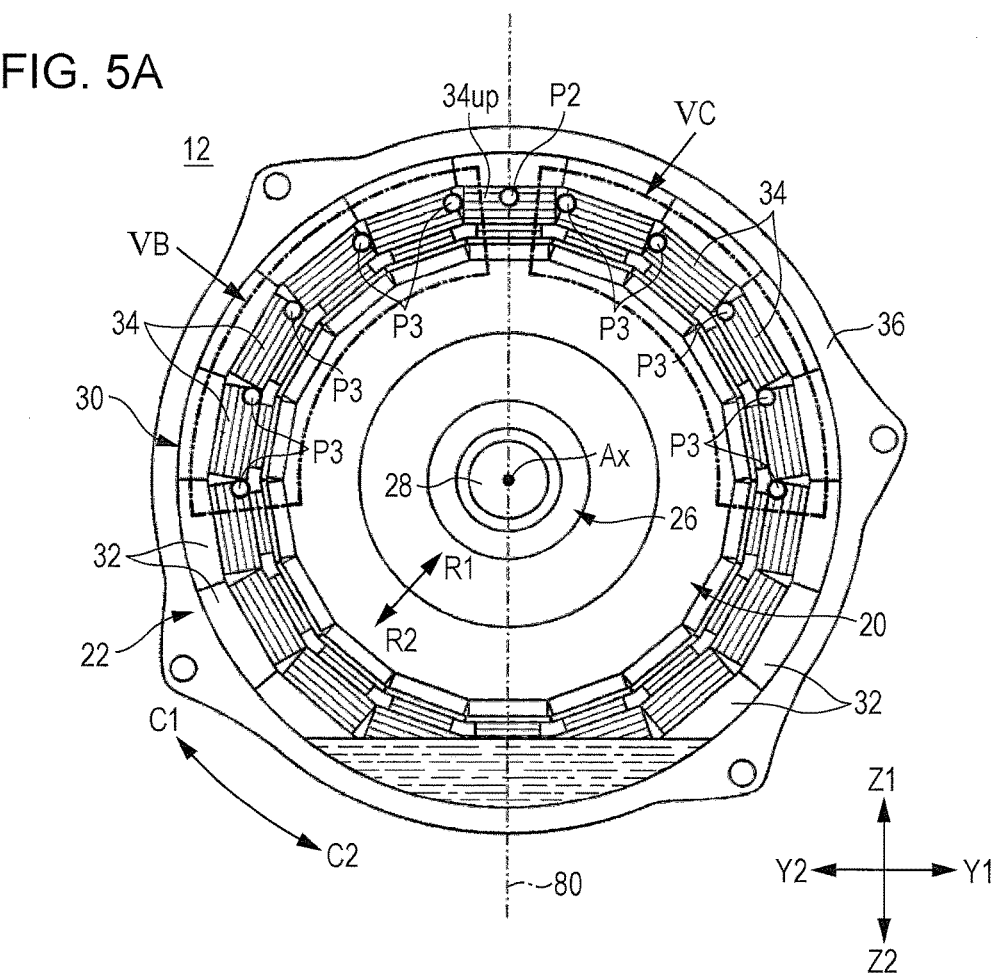
FIG. 5A is a schematic illustration of the motor as viewed in the rotational axis direction (the same as FIG. 2)
Figure 5B:
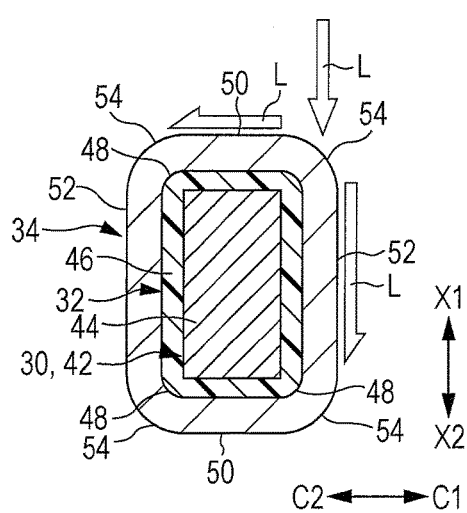
FIGS. 5B and 5C illustrate simplified cross-sections, taken along the radial direction, of a part of the motor on the left and right sides, respectively, of the imaginary vertical plane including the rotational axis.
Figure 5C:
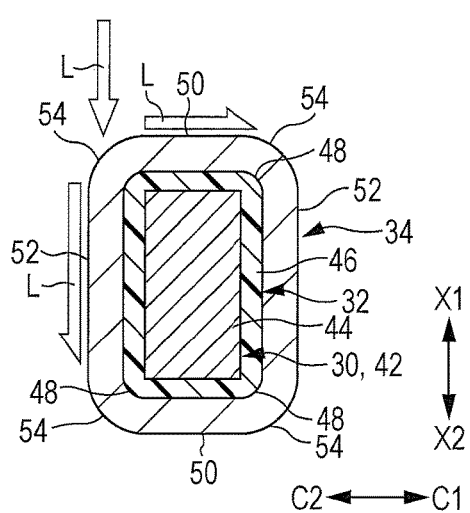

FIG. 4 is a perspective view illustrating the outward appearance of a part (a stator core 30, an insulator 32, and a coil 34 described later) of the motor 12 on the right side of an imaginary vertical plane 80 lying along the vertical direction Z1-Z2 and including a rotational axis Ax in FIG. 2. FIG. 5A is a schematic illustration of the motor 12 as viewed in the rotational axis direction X2 (the same as FIG. 2). FIGS. 5B and 5C illustrate simplified cross-sections, taken along a radial direction R2, of a part (a stator core 30, an insulator 32, and a coil 34 described later) of the motor 12 on the left and right sides, respectively, of the imaginary vertical plane 80 including the rotational axis Ax.

The motor 12 is a driving source for generating a driving force F for the vehicle 10. The motor 12 is of a three-phase alternating-current brushless type. The motor 12 generates the driving force F for the vehicle 10 on the basis of electric power supplied from a battery (not illustrated) via an inverter (not illustrated). In addition, the motor 12 charges the battery by outputting electric power generated by regeneration (regenerated power Preg) [W] to the battery. The regenerated power Preg may be outputted to a 12-volt system or auxiliary equipment (not illustrated).

As illustrated in FIGS. 1, 2, and the like, the motor 12 has a rotor 20, a stator 22, a motor housing (not illustrated), and the side cover 24.

(1-2-2. Rotor 20)

The rotor 20 is arranged on the inside of the stator 22 (on the radially inner side (R1 direction) of the stator 22). The rotor 20 is able to rotate about a rotating shaft 26 (rotational axis Ax). The rotating shaft 26 includes an in-shaft channel 28 for introducing refrigerant (for example, cooling oil). A part of refrigerant supplied via the side cover 24 is guided into the in-shaft channel 28 from a first discharge hole 74 described later. Thereafter, the refrigerant is discharged from a through-hole (not illustrated) provided in the rotating shaft 26, and cools the rotor 20 and the like. As for how refrigerant is supplied to the in-shaft channel 28 and how the refrigerant is circulated thereafter, the configuration described in, for example, International Publication WO 2012/046307 may be used.

(1-2-3. Stator 22)

As illustrated in FIGS. 1, 2, 4, and the like, the stator 22 has a stator core 30, a plurality of insulators 32 (insulating members), a plurality of coils 34, and a stator holder 36. The stator 22 stands in the vertical direction Z1 so that the horizontal axis Ax becomes horizontal.

The stator core 30 is made up of so-called split cores. The stator core 30 includes an annular yoke part 40 (FIG. 4), and teeth 42. The teeth 42 protrudes from the yoke part 40 in the radial direction R1, and has a conductor winding part 44 (FIG. 5B and the like) that is based on a rectangular prism shape. The expression "based on a rectangular prism shape" as used herein includes, for example, a rectangular truncated pyramid shape.

The insulators 32 provide insulation between the teeth 42 (conductor winding part 44) of the stator core 30, and the coils 34. The part of each of the insulators 32 which covers the conductor winding part 44 (hereinafter, referred to as "teeth covering part 46" (see FIG. 5B and the like)) is based on a rectangular tube shape that conforms to the shape of the conductor winding part 44. When viewed in the radial direction R1-R2, a corner portion 48 of the teeth covering part 46 (hereinafter, also referred to as "insulator corner portion 48") is substantially arc-shaped (see FIG. 5B and the like) or chamfered. This makes it easier to form a corner portion 54 of each of the coils 34 in a substantially arc shape. The term "arc" as used herein is not limited to a perfect circle but may be a smooth curve such as an elliptical arc.

The coils 34 are formed by winding a conductor (magnet wire) around the conductor winding part 44 via the insulators 32. As illustrated in FIG. 2, the coils 34 are arranged in an annular shape.

As mentioned above, the conductor winding part 44 of the stator core 30 is based on a rectangular prism shape, and the teeth covering part 46 of each of the insulators 32 is based on a rectangular tube shape. Therefore, each of the coils 34 formed by a conductor wound around the teeth covering part 46 is based on a rectangular tube shape. Hereinafter, the end face of each of the coils 34 facing in the rotational axis direction X1-X2 (hereinafter also referred to as "axial direction X1-X2") will be referred to as an axial end face 50 (see FIG. 4 and the like), and the end face of each of the coils 34 facing in the circumferential direction C1-C2 will be referred to as a circumferential end face 52.

When viewed in the radial direction R1-R2, the insulator corner portion 48 is substantially arc-shaped or chamfered. Therefore, when viewed in the radial direction R1-R2, the corner portion 54 of the conductor winding part 44 of each of the coils 34 (hereinafter, also referred to as "coil corner portion 54") is substantially arc-shaped (see FIGS. 4, 5B, and the like).

As for the basic configuration of the stator, a configuration according to related art may be used. The configuration is described in, for example, International Publication WO 2012/046307 or Japanese Unexamined Patent Application Publication No. 2012-016100, the entire contents of which are incorporated herein by reference.

(1-2-4. Motor Housing)

The motor housing (not illustrated) accommodates the rotor 20 and the stator 22, and protects the rotor 20 and the stator 22. As for the motor housing, a motor housing described in, for example, International Publication WO 2012/046307 may be used.

(1-2-5. Side Cover 24)

The side cover 24 is secured to the motor housing in the axial direction X2 and protects the rotor 20 and the stator 22. The side cover 24 also serves as a part of the cooling system 16 (cooling structure). The side cover 24 serving as a part of the cooling system 16 will be described later.

[1-3. Speed Reducer 14]

The speed reducer 14 transmits the driving force F generated by the motor 12 to vehicle wheels (not illustrated) via a drive shaft (not illustrated). As for the basic configuration of the speed reducer, a speed reducer described in, for example, International Publication WO 2012/046307 may be used.

[1-4. Cooling System 16]
(1-4-1. Overview of Cooling System 16)

The cooling system 16 cools the motor 12 and the speed reducer 14. As illustrated in FIG. 1, in addition to the side cover 24, the cooling system 16 has a strainer 60, a pump 62, a radiator (not illustrated), and a pipe 64.

The strainer 60 filters refrigerant (for example, cooling oil) admitted from an inlet 66 arranged in a lower part of the interior of the motor housing that is the casing of the motor 12. The pump 62 circulates the refrigerant within a refrigerant supply passage 68 including the side cover 24, the pipe 64, and the like. The pump 64 may be either of an electric pump and a mechanical pump. The radiator removes heat from the refrigerant. Moreover, as illustrated in FIG. 1 and the like, the refrigerant is discharged to each of the rotor 20 and the stator 22 from the side cover 24.

(1-4-2. Side Cover 24)

As illustrated in FIG. 1, the side cover 24 has a single inlet hole 70, an in-cover channel 72, a single first discharge hole 74, a single second discharge hole 76, and a plurality of third discharge holes 78. Refrigerant is supplied from the pump 62 to the first discharge hole 74, the second discharge hole 76, and the third discharge holes 78 which serve as refrigerant supply ports, via the pipe 64, the in-cover channel 72, and the like.

As mentioned above, as illustrated in FIG. 1 and the like, refrigerant is supplied to each of the rotor 20 and the stator 22 of the motor 12 from the first discharge hole 74, the second discharge hole 76, and the third discharge holes 78 of the side cover 24.

Specifically, the first discharge hole 74 discharges refrigerant mainly to the rotating shaft 26 of the rotor 20. The first discharge hole 74 has a nozzle-like shape, which allows refrigerant to be discharged. The position P1 of the first discharge hole 74, movement of refrigerant after being discharged from the first discharge hole 74, and the like are the same as those described in, for example, International Publication WO 2012/046307.

The second discharge hole 76 and the third discharge holes 78 discharge refrigerant mainly to the stator 22. The second discharge hole 76 and the third discharge holes 78 have a nozzle-like shape, which allows refrigerant to be discharged. The respective positions P2 and P3 (see FIG. 2 and the like) of the second discharge hole 76 and third discharge holes 78 differ from those of the discharge holes 95 described in, for example, International Publication WO 2012/046307.

2. Arrangement of Second Discharge Hole 76 and its Effect and Advantage

As illustrated in FIG. 2 and the like, the second discharge hole 76 is provided at a position corresponding to the coil 34 located uppermost in the vertical direction Z1-Z2 (hereinafter, referred to as "uppermost coil 34*up*"). More specifically, as illustrated in FIG. 2 and the like, when viewed in the axial direction X2, the second discharge hole 76 is arranged at the center of the circumferential direction C1-C2 of the uppermost coil 34*up*. In addition, when viewed in the axial direction X2, the second discharge hole 76 is arranged on the outside (R2 direction) of the center of the uppermost coil 34*up* in the radial direction R1-R2.

Arranging the second discharge hole 76 in this way means that refrigerant discharged from the second discharge hole 76 hits a wide area of the axial end face 50, thereby making it possible to effectively cool the uppermost coil 34*up*.

3. Arrangement of Third Discharge Holes 78 and its Effects and Advantages

The arrangement of the third discharge holes 78 has four characteristic features. Those characteristic features and their respective effects and advantages will be described below.

[3-1. With Regard to Characteristic Feature 1]

As illustrated in FIGS. 5A to 5C and the like, when viewed in the axial direction X2, on both sides of an imaginary vertical plane 80 lying along the vertical direction Z1-Z2 and including the rotational axis Ax (or an imaginary vertical line extending in the vertical direction Z1-Z2 and passing through the rotational axis Ax), each of the third discharge holes 78 (positions P3) is arranged at a position opposite to the corner portion 54 positioned at the vertically upper side (Z1 direction).

That is, in FIG. 5A, each of the third discharge holes 78 (positions P3) on the left side of the imaginary vertical plane 80 is arranged at a position corresponding to the corner portion 54 positioned at the right side or upper side (circumferential direction C1) of each of the coils 34. In addition, in FIG. 5A, each of the third discharge holes 78 on the right side of the imaginary vertical plane 80 is arranged at a position corresponding to the corner portion 54 positioned at the left side or upper side (circumferential direction C2) of each of the coils 34.

According to Characteristic Feature 1, each of the third discharge holes 78 is arranged at a position opposite to each of the corner portions 54 (see FIGS. 1 to 5C). As a result, as illustrated in FIGS. 4, 5B, and 5C, supplied refrigerant is easily brought into contact with both the axial end face 50 and the circumferential end face 52 of each of the coils 34. Therefore, the coils 34 can be cooled with improved efficiency.

Moreover, according to Characteristic Feature 1, each of the third discharge holes 78 is arranged at a position opposite to the corner portion 54 positioned at the vertically upper side (Z1 direction) (see FIG. 5A and the like). Consequently, after refrigerant makes contact with the axial end face 50 or the circumferential end face 52, the refrigerant then flows vertically downward (Z2 direction) along the axial end face 50 or the circumferential end face 52 owing to gravity (see FIG. 4). Therefore, on the axial end face 50 or the circumferential end face 52, the refrigerant is easily brought into contact with each of the coils 34 not only at a position opposite to the corresponding third discharge hole 78 and where the refrigerant directly hits each of the coils 34, but also at positions located on the vertically lower side (Z2 direction) of the position opposite to the corresponding third discharge hole 78. As a result, the coils 34 can be cooled with further improved efficiency.

[3-2. With Regard to Characteristic Feature 2]

As illustrated in FIG. 5A and the like, when viewed in the rotational axis direction X2, the third discharge holes 78 are arranged substantially symmetrically (in line symmetry) on both sides of the imaginary vertical plane 80 lying along the vertical direction Z1-Z2 and including the rotational axis Ax (or an imaginary vertical line extending in the vertical direction Z1-Z2 and passing through the rotational axis Ax).

The expression "substantially symmetrically" as used herein refers to, for example, a state in which, supposing that there is only one uppermost coil (uppermost coil 34*up*) in the vertical direction Z1-Z2, and the uppermost coil 34*up* overlaps the imaginary vertical plane 80, the coils 34 exist in pairs across the imaginary vertical plane 80, and the third discharge holes 78 exist at symmetrical positions for each of these pairs of coils 34. In other words, this refers to a state in which, when viewed in the axial direction X2, even if the coils 34 arranged in an annular shape are displaced in the circumferential direction C1-C2, and the coils 34 are not arranged in perfect symmetry across the imaginary vertical plane 80, the third discharge holes 78 exist at positions corresponding to each of the coils 34 existing in pairs across the imaginary vertical plane 80.

In a case where two uppermost coils 34$up$ exist in the vertical direction Z1-Z2, and the coils 34 are arranged symmetrically across the imaginary vertical plane 80 (for example, in a case where there are an even number of coils 34, and for any one of the coils 34, there is another coil 34 that forms a pair with that coil 34 across the imaginary vertical plane 80), the expression "substantially symmetrically" refers to a state in which there exist pairs of coils 34 across the imaginary vertical plane 80, and the third discharge holes 78 exist at symmetrical positions in each of these pairs of coils 34.

According to Characteristic Feature 2, the third discharge holes 78 are arranged substantially symmetrically on both sides of the imaginary vertical plane 80 lying along the vertical direction Z1-Z2 and including the rotational axis Ax (see FIG. 5A and the like). As a result, it is possible to cool the coils 34 in a substantially uniform manner on both sides of the imaginary vertical plane 80, which makes it easier to prevent some of the coils 34 from rising in temperature relative to the other coils 34.

[3-3. With Regard to Characteristic Feature 3]

Figure 6:
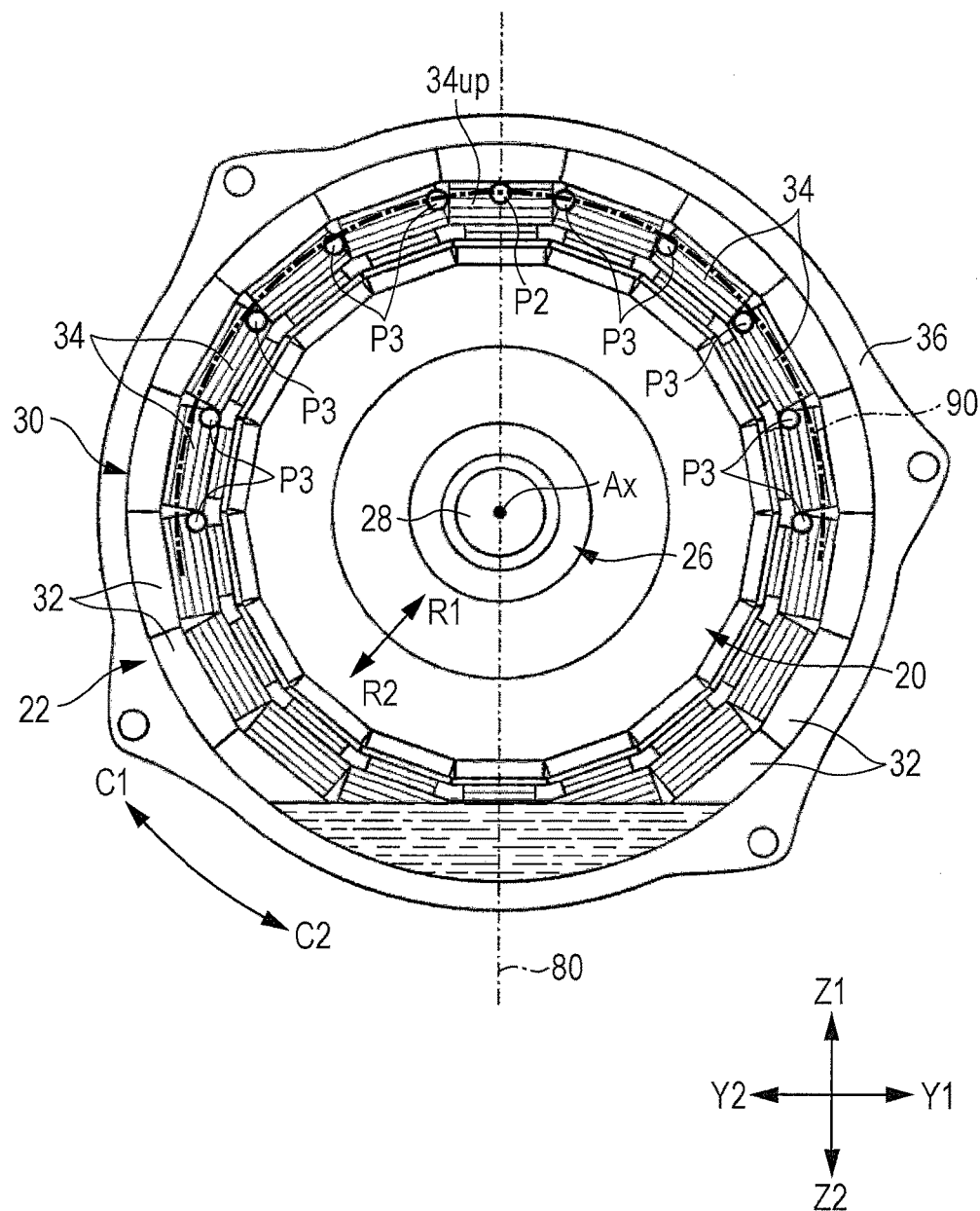
FIG. 6 illustrates how third discharge holes are arranged.

FIG. 6 illustrates how the third discharge holes 78 are arranged. As illustrated in FIG. 6, the more upward each of the coils 34 is positioned in the vertical direction Z1-Z2, the more radially outward (R2 direction) is the position P3 of the corresponding third discharge hole 78, and the more toward the center each of the coils 34 is positioned in the vertical direction Z1-Z2, the more radially toward the center is the position P3 of the corresponding third discharge hole 78.

For example, suppose a circle that is centered on the rotational axis Ax and passes through the third discharge hole 78 positioned uppermost (uppermost in FIG. 6) in the vertical direction Z1-Z2 (hereafter referred to as "uppermost discharge hole 78$up$"). When such a circle is defined as a circle 90, the third discharge holes 78 other than the uppermost discharge hole 78$up$ are arranged not on the circle 90 but inside the circle 90.

In the case of a configuration in which, as in the present embodiment, the stator 22 stands in the vertical direction Z1 so that the rotational axis Ax becomes horizontal, and the coils 34 are arranged in an annular shape, the more upward from the center each of the coils 34 is positioned in the vertical direction Z1-Z2 (the more upward each of the coils 34 is positioned), the closer to perpendicular the circumferential end face of each of the coils 34 becomes (the larger (the closer to 90°) the angle formed with respect to the horizontal plane becomes). In addition, the closer to the center each of the coils 34 is positioned in the vertical direction Z1-Z2, the closer to horizontal its circumferential end face 52 becomes (the smaller (the closer to 0°) the angle formed with respect to the horizontal plane becomes). Therefore, in the coils 34 positioned at the upper side in the vertical direction Z1-Z2, in comparison to the coils 34 on the center side, the refrigerant discharged to the circumferential end face 52 readily flows vertically downward (Z2 direction) along the circumferential end face 52 owing to gravity.

According to Characteristic Feature 3, the more upward each of the coils 34 is positioned in the vertical direction Z1-Z2, the more radially outward (R2 direction) the corresponding third discharge hole 78 is positioned. Consequently, for the coils 34 positioned at the upper side in the vertical direction Z1-Z2 (for example, the uppermost coil 34$up$), refrigerant is discharged radially outward (R2 direction), thereby making it possible to increase the area of contact of the circumferential end face 52 with the refrigerant. In addition, according to Characteristic Feature 3, the more toward the center each of the coils 34 is positioned in the vertical direction Z1-Z2, the more radially toward the center (the closer to the center) the corresponding third discharge hole 78 is positioned. Therefore, for the coils 34 positioned on the center side in the vertical direction Z1-Z2, refrigerant is discharged toward the center in the radial direction. This makes it easier for the refrigerant to spread over each of the axial end face 50 and the circumferential end face 52, thereby making it possible to increase the area of contact with the refrigerant.

[3-4. With Regard to Characteristic Feature 4]

Figure 7:
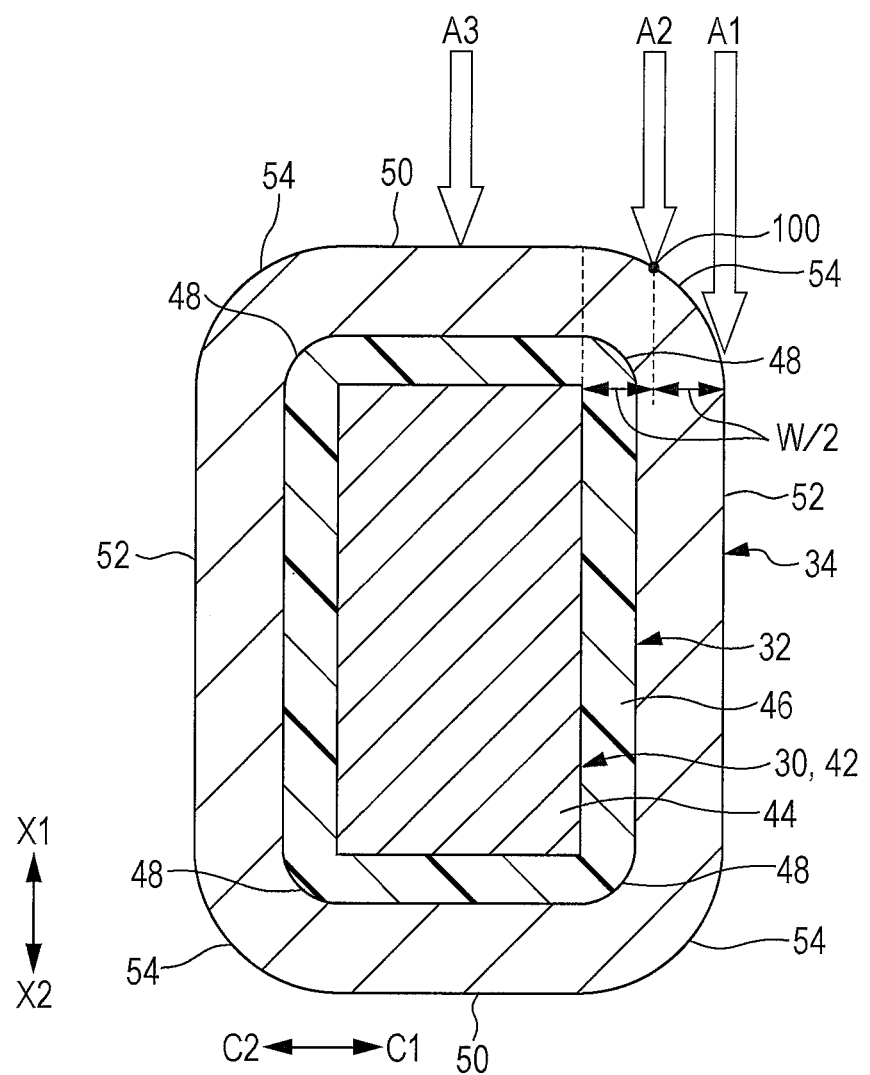
FIG. 7 illustrates positions where refrigerant is discharged to a coil.

FIG. 7 illustrates positions where refrigerant is discharged to each of the coils 34. FIG. 7 illustrates the teeth 42 (the conductor winding part 44), each of the insulators 32 (the teeth covering part 46), and each of the coils 34 of the stator core 34 in simplified cross-sectional view taken along the radial direction R2. In FIG. 7, the position or direction in which refrigerant is discharged in the present embodiment is indicated by an arrow A2. Arrows A1 and A3 indicate the positions or directions in which refrigerant is discharged in accordance with a first comparative example and a second comparative example, respectively.

In the first comparative example (arrow A1), each of the third discharge holes 78 is arranged so that refrigerant is discharged directly aiming at the circumferential end face 52 of each of the coils 34. In the second comparative example (arrow A3), each of the third discharge holes 78 is arranged so that refrigerant is discharged directly aiming at the center of the axial end face 50 of each of the coils 34 in the circumferential direction C1-C2.

In the present embodiment, when viewed in the radial direction R2, each of the third discharge holes 78 is arranged at a position opposite to a central portion 100 (FIG. 7) in the circumferential direction C1-C2 of the corner portion 54 positioned at the vertically upper side (Z1 direction). The term central portion 100 as used herein is defined as follows. That is, letting a width W represent the width of the corner portion 54 when the opposing coil 34 is viewed from the corresponding third discharge hole 78, the central portion 100 lies at a position that divides the width W in half.

According to Characteristic Feature 4, for example, in comparison to the first comparative example (arrow A) and the second comparative example (arrow B), supplied refrigerant can be spread over both the axial end face 50 and the circumferential end face 52 of each of the coils 34. Moreover, in comparison to the first comparative example (arrow A), even when the coils 34 or the third discharge holes 78 are slightly displaced to the circumferential end face 52 side within the dimensional tolerance allowed, it is easier to prevent the refrigerant from passing through the space between the coils 34.

B. Modifications

The present disclosure is not limited to the above-mentioned embodiment but may, of course, be configured in various ways on the basis of the description of this specification. For example, the following configurations may be adopted.

1. Scope of Application

While the cooling system 16 is equipped to the vehicle 10 in the above-mentioned embodiment, this should not be construed restrictively. The cooling system 16 may be applied to other uses in which a rotating electric machine such as the motor 12 is employed. For example, while the cooling system 16 is used for the motor 12 used for driving the vehicle 10 in the above-mentioned embodiment, the cooling system 16 may be employed for rotating electric machines intended for other uses (for example, electric power steerings, air-conditioners, or air compressors) in the vehicle 10. Alternatively, the cooling system 16 may be used for rotating electric machines used in pieces of equipment such as industrial machines or consumer electronics.

2. Motor 12 (Rotating Electric Machine)

[2-1. Motor 12 as a Whole]

While the motor 12 is of a three-phase alternating-current type in the above-mentioned embodiment, from the viewpoint of a rotating electric machine cooled by the cooling system 16, the motor 12 may be of another alternating-current or a direct-current type. While the motor 12 is of a brushless type in the above-mentioned embodiment, the motor 12 may be of a brush type. While the stator 22 is arranged on the radially outer side (R2 direction) of the rotor 20 (see FIG. 1 and the like), this should not be construed restrictively. The stator 22 may be arranged on the radially inner side (R1 direction) of the rotor 20. In this case, the teeth 42 may be protruded radially outward (R2 direction) with respect to the yoke part 40.

While the motor 12 is used in the above-mentioned embodiment, from the viewpoint of a rotating electric machine cooled by the cooling system 16, a rotating electric machine other than the motor 12 (for example, a generator) may be used.

[2-2. Stator 22]

In the above-mentioned embodiment, the stator 22 stands in the vertical direction Z1 so that the rotational axis Ax becomes horizontal. However, from the viewpoints of Characteristic Features 1 to 4 mentioned above, the stator 22 may not necessarily stand in the vertical direction Z1 so that the rotational axis Ax becomes horizontal. The stator 22 may be tilted so that the rotational axis Ax becomes closer to the vertical direction Z1.

[2-3. Coil 34]

In the above-mentioned embodiment, the conductor winding part 44 of the stator core 30 is based on a rectangular prism shape, and the teeth covering part 46 of each of the insulators 32 is based on a rectangular tube shape. Consequently, each of the coils 34 is based on a rectangular tube shape. However, from the viewpoints of Characteristic Features 1 to 4 mentioned above, the shape of the coils 34 may be based on a polygonal tube shape (for example, a hexagonal tube shape or an octagonal tube shape) other than a rectangular tube shape. In this case, the shapes of the conductor winding part 44 of the stator core 30 and the teeth covering part 46 of each of the insulators 32 may be changed in conformity to the target shape of each of the coils 34.

3. Cooling System 16

[3-1. Refrigerant]

While cooling oil is used as a refrigerant (cooling fluid) in the above-mentioned embodiment, from the viewpoint of cooling capability, a cooling fluid other than cooling oil (for example, water) may be used. However, it may not be possible to use such a cooling fluid for the purpose of lubricating the speed reducer 14.

[3-2. Side Cover 24]

(3-2-1. First Discharge Hole 74 and Second Discharge Hole 76)

While the side cover 24 is provided with the first discharge hole 74 and the second discharge hole 76 in the above-mentioned embodiment, by directing attention to the third discharge holes 78, at least one of the first discharge hole 74 and the second discharge hole 76 may not be provided.

(3-2-2. Third Discharge Holes 78)

In the above-mentioned embodiments, of all the coils 34, the third discharge holes 78 are arranged at positions corresponding to the coils 34 positioned at the vertically upper side (upper side in FIG. 2 and the like), and the third discharge holes 78 are not arranged at positions corresponding to the coils 34 positioned at the vertically lower side (except for the coil 34 positioned uppermost among the coils 34 positioned at the vertically lower side). However, by directing attention to at least one of Characteristic Features 1 to 4 mentioned above, the positions of the third discharge holes 78 are not limited to those mentioned above. For example, of all the coils 34, the third discharge holes 78 may be provided at positions corresponding to the coils 34 positioned at the vertically lower side, in addition to or instead of the coils 34 positioned at the vertically upper side.

In a case where, of all the coils 34, the third discharge holes 78 are provided at positions corresponding to the coils 34 positioned at the vertically lower side (lower side in FIG. 2 and the like), from the viewpoint of Characteristic Feature 3 mentioned above, for example, the lower each of the coils 34 is positioned in the vertical direction Z1-Z2, the more radially inward (R1 direction) the corresponding third discharge hole 78 may be positioned.

In the above-mentioned embodiment, when viewed in the rotational axis direction X2, each of the third discharge holes 78 is arranged at a position opposite to the corner portion 54 positioned at the vertically upper side (Z1 direction), on both sides of the imaginary vertical plane 80 lying along the vertical direction Z1-Z2 and including the rotational axis Ax (or an imaginary vertical line extending in the vertical direction Z1-Z2 and passing through the rotational axis Ax) (Characteristic Feature 1). However, from the viewpoints of Characteristic Features 2 to 4 mentioned above, this should not be construed restrictively. For example, at least one of the third discharge holes 78 may be arranged at a position opposite to the corner portion 54 positioned at the vertically lower side (Z2 direction).

According to the embodiment mentioned above, when viewed in the rotational axis direction X2, the third discharge holes 78 are arranged substantially symmetrically on both sides of the imaginary vertical plane 80 lying along the vertical direction Z1-Z2 and including the rotational axis Ax (Characteristic Feature 2). However, from the viewpoints of Characteristic Features 1, 3, and 4 mentioned above, this should not be construed restrictively. For example, the third discharge holes 78 may not be arranged substantially symmetrically on both sides of the imaginary vertical plane 80 (or an imaginary vertical line passing through the rotational axis Ax).

According to the embodiment mentioned above, the more upward each of the coils 34 is positioned in the vertical direction Z1-Z2, the more radially outward (R2 direction) is the position P3 of the corresponding third discharge hole 78, and the more toward the center each of the coils 34 is positioned in the vertical direction Z1-Z2, the more radially toward the center is the position P3 of the corresponding third discharge hole 78 (Characteristic Feature 3). However, from the viewpoints of Characteristic Features 1, 2, and 4 mentioned above, this should not be construed restrictively. For example, the third discharge holes 78 may be arranged on the same circle centered on the rotational axis Ax (for example, the circle 90 illustrated in FIG. 6).

According to the embodiment mentioned above, when viewed in the radial direction R2, each of the third discharge holes 78 is arranged at a position opposite to the central portion 100 in the circumferential direction C1-C2 of the corner portion 54 positioned at the vertically upper side (Z1 direction) (Characteristic Feature 4). However, from the viewpoints of Characteristic Features 1 to 3 mentioned above, this should not be construed restrictively. For example, each of the third discharge holes 78 may be arranged at a position other than the central portion 100 of the corner portion 54 (for example, at the position according to the first comparative example (arrow A1) shown in FIG. 7).

While the embodiment mentioned above assumes the discharge direction (center axis) of the third discharge holes 78 to be in parallel to the axial direction X2 (see FIG. 1 and the like), by directing attention to the discharge position of refrigerant with respect to the coils 34, this should not be construed restrictively. For example, the discharge direction (center axis) of the third discharge holes 78 may be inclined upward, downward, to the left, to the right, or the like when viewed in the axial direction X2. In other words, from the viewpoint of Characteristic Feature 1 mentioned above, the fact that each of the third discharge holes 78 is opposite to the corner portion 54 at the vertically upper side (Z1 direction) means that refrigerant discharged from each of the third discharge holes 78 directly hits the corner portion 54 at the vertically upper side (Z1 direction).

According to an embodiment, there is provided a cooling structure for a rotating electric machine, including a stator that has a stator core, an insulating member, and a plurality of coils, a plurality of refrigerant supply ports that are arranged at a distance from the coils in a rotational axis direction, and a refrigerant supply passage that guides a refrigerant to the refrigerant supply ports. The stator core includes a yoke part that has an annular shape, and teeth that extend from the yoke part in a radial direction, the teeth having a conductor winding part that is based on a prism shape. The coils are formed by winding a conductor around the conductor winding part via the insulating member. The coils are arranged in an annular shape when viewed in the rotational axis direction. Each of the coils has a corner portion having an arc shape when viewed in the radial direction. The refrigerant supply ports are arranged at a distance from each other in an at least circumferential direction. The refrigerant supply ports are arranged substantially symmetrically on both sides of an imaginary vertical plane, the imaginary vertical plane lying along a vertical direction and including a rotational axis of the rotating electric machine. Each of the refrigerant supply ports is arranged at a position opposite to the corner portion located at a vertically upper side, on the both sides of the imaginary vertical plane.

According to the embodiment, each of the refrigerant supply ports is arranged at a position opposite to the corner portion of the conductor winding part of each of the coils. As a result, supplied refrigerant is easily brought into contact with both the axial end face and the circumferential end face of each of the coils. Therefore, the coils can be cooled with improved efficiency.

Moreover, according to the embodiment, each of the refrigerant supply ports is arranged at a position opposite to the corner portion located at the vertically upper side. Consequently, after refrigerant makes contact with the axial end face or the circumferential end face, the refrigerant then flows vertically downward along the axial end face or the circumferential end face owing to gravity. Therefore, on the axial end face or the circumferential end face, the refrigerant is easily brought into contact with each of the coils not only at a position opposite to the corresponding refrigerant supply port and where the refrigerant directly hits the coils, but also at positions located on the vertically lower side of the positions opposite to the corresponding refrigerant supply port. As a result, the coils can be cooled with further improved efficiency.

According to the embodiment, the refrigerant supply ports are arranged substantially symmetrically on both sides of the imaginary vertical plane lying along the vertical direction and including the rotational axis. As a result, it is possible to cool the coils in a substantially uniform manner on both sides of the imaginary vertical plane, which makes it easier to prevent some of the coils from rising in temperature relative to the other coils.

The cooling structure according to the embodiment may be configured so that each of the refrigerant supply ports is arranged at a position opposite to a circumferentially central portion of the corner portion located at the vertically upper side. As a result, supplied refrigerant can be spread over both the axial end face and the circumferential end face of each of the coils. Moreover, even when the coils or the refrigerant supply ports are slightly displaced to the circumferential end face side within the dimensional tolerance allowed, it is easier to prevent the refrigerant from passing through the space between the coils.

The cooling structure according to the embodiment may be configured as follows. That is, the stator stands in the vertical direction so that the rotational axis of the rotating electric machine becomes horizontal. When viewed in the rotational axis direction, each of the refrigerant supply ports is arranged at a position corresponding to a corresponding one of the coils which is positioned on an upper side of a center in the vertical direction. The more upward each of the coils is positioned in the vertical direction, the more outward a corresponding one of the refrigerant supply ports is positioned in the radial direction, and the more toward a center each of the coils is positioned in the vertical direction, the more toward a center a corresponding one of the refrigerant supply ports is positioned in the radial direction.

In the case of a configuration in which the stator stands in the vertical direction so that the rotational axis becomes horizontal, and the coils are arranged in an annular shape, the more upward from the center each of the coils is positioned in the vertical direction, the closer to perpendicular the circumferential end face of each of the coils becomes (the larger (the closer to 90°) the angle formed with respect to the horizontal plane becomes). In addition, the closer to the center each of the coils is positioned in the vertical direction, the closer to horizontal its circumferential end face becomes (the smaller (the closer to 0°) the angle formed with respect to the horizontal plane becomes). Therefore, in the coils positioned at the upper side in the vertical direction, in comparison to the coils on the center side, refrigerant that is subject to discharge (including injection) to the circumferential side face readily flows vertically downward along the circumferential end face owing to gravity.

According to the embodiment, the more upward each of the coils is positioned in the vertical direction, the more radially outward the corresponding refrigerant supply port is positioned. Consequently, for the coils positioned at the upper side in the vertical direction, refrigerant is discharged radially outward, thereby making it possible to increase the area of contact of the circumferential side face with the refrigerant. In addition, according to the present embodiment, the more toward the center each of the coils is positioned in the vertical direction, the more radially toward the center the corresponding refrigerant supply port is positioned. Therefore, for the coils positioned on the center side in the vertical direction, refrigerant is discharged toward the center in the radial direction. This makes it easier for the refrigerant to spread over each of the axial end face and the circumferential end face, thereby making it possible to increase the area of contact with the refrigerant.

Obviously, numerous modifications and variations of the present invention are possible in light of the above teachings. It is therefore to be understood that within the scope of the appended claims, the invention may be practiced otherwise than as specifically described herein.

What is claimed is:

1. A cooling structure for a rotating electric machine, comprising:
   a stator comprising:
      a stator core including a yoke part and teeth, the yoke part having an annular shape, the teeth extending from the yoke part in a radial direction of the rotating electric machine, the teeth having a conductor winding part that is based on a prism shape;
      an insulating member; and
      a plurality of coils provided by winding a conductor around the conductor winding part via the insulating member, the plurality of coils being arranged in an annular shape when viewed in a rotational axis direction of the rotating electric machine, each of the plurality of coils including a corner portion having an arc shape when viewed in the radial direction;
   a plurality of refrigerant supply ports that are arranged at a distance from the plurality of coils in the rotational axis direction; and
   a refrigerant supply passage to guide a refrigerant to the plurality of refrigerant supply ports, the plurality of refrigerant supply ports being arranged at a distance from each other at least in a circumferential direction of the rotating electric machine,
   wherein the plurality of coils includes a first coil provided at a highest location of the plurality of coils when the cooling structure is oriented in an operational state, the first coil being symmetrically aligned on a vertical plane defined along a vertical direction of the cooling structure oriented in the operational state, the vertical plane including a rotational axis of the rotating electric machine,
   the plurality of refrigerant supply ports being arranged substantially symmetrically on both sides of the vertical plane,
   the plurality of refrigerant supply ports including a single first refrigerant supply port arranged opposite to a center of the first coil on the vertical plane,
   the plurality of refrigerant supply ports including a plurality of second refrigerant supply ports, each of the plurality of second refrigerant supply ports being arranged opposite to the corner portion located at a vertically upper side of a respective coil of the plurality of coils, on both sides of the vertical plane,
   wherein the stator core stands in the vertical direction so that the rotational axis of the rotating electric machine becomes horizontal,
   wherein, when viewed in the rotational axis direction, each of the plurality of second refrigerant supply ports is arranged at a position corresponding to a corresponding coil of the plurality of coils which is positioned on an upper side of the rotational axis in the vertical direction,
   wherein the more upward each of the plurality of coils is positioned in the vertical direction, the more outward a corresponding second refrigerant supply port of the plurality of second refrigerant supply ports is positioned in the radial direction, and
   wherein the more toward a horizontal plane extending through the rotational axis each of the plurality of coils is positioned in the vertical direction, the more toward the rotational axis a corresponding second refrigerant supply port of the plurality of second refrigerant supply ports is positioned in the radial direction.

2. The cooling structure according to claim 1, wherein each of the plurality of second refrigerant supply ports is arranged opposite to a circumferentially central portion of the corner portion located at the vertically upper side.

3. The cooling structure according to claim 1, wherein the plurality of second refrigerant supply ports are offset from and not aligned with a circumferential end face of the respective coils.

* * * * *